(12) United States Patent
Soracco et al.

(10) Patent No.: US 9,330,406 B2
(45) Date of Patent: *May 3, 2016

(54) METHOD AND SYSTEM FOR SALES OF GOLF EQUIPMENT

(71) Applicant: Cobra Golf Incorporated, Carlsbad, CA (US)

(72) Inventors: Peter L. Soracco, Carlsbad, CA (US); Karl A. Clausen, Carlsbad, CA (US)

(73) Assignee: COBRA GOLF INCORPORATED, Carlsbad, CA (US)

( * ) Notice: Subject to any disclaimer, the term of this patent is extended or adjusted under 35 U.S.C. 154(b) by 416 days.

This patent is subject to a terminal disclaimer.

(21) Appl. No.: 13/692,413

(22) Filed: Dec. 3, 2012

(65) Prior Publication Data

US 2013/0097050 A1  Apr. 18, 2013

Related U.S. Application Data

(63) Continuation-in-part of application No. 13/192,394, filed on Jul. 27, 2011, now Pat. No. 8,323,122, which is a continuation of application No. 12/468,129, filed on May 19, 2009, now Pat. No. 8,007,373.

(51) Int. Cl.
*A63B 53/00* (2015.01)
*G06Q 30/06* (2012.01)
(Continued)

(52) U.S. Cl.
CPC ............ *G06Q 30/0621* (2013.01); *A63B 53/04* (2013.01); *A63B 53/047* (2013.01); *A63B 60/42* (2015.10); *B22F 3/1055* (2013.01);
(Continued)

(58) Field of Classification Search
CPC .................................................... A63B 59/0074
USPC ................................. 473/324–350, 407, 409
See application file for complete search history.

(56) References Cited

U.S. PATENT DOCUMENTS 2,797,201 A  6/1957  Veatch et al.
2,880,002 A *  3/1959  Wetty ............................ 473/349
(Continued)

FOREIGN PATENT DOCUMENTS

DE  4410046 C1  5/1995
EP  1092470 A1  4/2001
(Continued)

OTHER PUBLICATIONS

International Search Report and Written Opinion for PCT Application No. PCT/US2010/035286 mailed Aug. 5, 2010, 8 pages.
(Continued)

*Primary Examiner* — Gene Kim
*Assistant Examiner* — Matthew B Stanczak
(74) *Attorney, Agent, or Firm* — Brown Rudnick LLP; Mark S. Leonardo

(57) ABSTRACT

Methods and systems for selecting and fabricating individualized golf clubs or golf club components. Using a website, for example, a golfer can input relevant information about his or her golf game, receive recommendations for golf club components, select from the recommendations, and have the desired golf club components manufactured and delivered. In some embodiments, the golf club components include custom golf club heads fabricated using layer by layer processing, such as direct metal laser sintering.

13 Claims, 6 Drawing Sheets

(51) Int. Cl.
*A63B 53/04* (2015.01)
*B22F 3/105* (2006.01)
*B22F 3/11* (2006.01)
*B22F 5/10* (2006.01)
*B22F 7/06* (2006.01)

(52) U.S. Cl.
CPC .. *B22F 3/11* (2013.01); *B22F 5/10* (2013.01); *B22F 7/06* (2013.01); *A63B 53/0466* (2013.01); *A63B53/0487* (2013.01); *A63B 2053/0433* (2013.01); *A63B 2053/0437* (2013.01); *B22F 2207/17* (2013.01); *Y02P 10/295* (2015.11); *Y10T 29/49* (2015.01)

(56) References Cited

U.S. PATENT DOCUMENTS

| | | | | |
|---|---|---|---|---|
| 3,455,558 | A * | 7/1969 | Onions | 473/290 |
| 3,591,183 | A * | 7/1971 | Ford | 473/314 |
| 3,698,239 | A * | 10/1972 | Everett, III | 73/65.03 |
| 3,716,347 | A | 2/1973 | Bergstrom et al. | |
| 3,814,437 | A * | 6/1974 | Winquist | 473/350 |
| 3,941,390 | A * | 3/1976 | Hussey | 473/292 |
| 3,961,909 | A | 6/1976 | Shapiro | |
| 4,162,794 | A * | 7/1979 | Thompson | 473/328 |
| 4,204,684 | A * | 5/1980 | Molitor | 473/349 |
| 4,261,566 | A * | 4/1981 | MacDougall | 473/289 |
| 4,331,477 | A | 5/1982 | Kubo et al. | |
| 4,710,223 | A | 12/1987 | Matejczyk | |
| 4,784,690 | A | 11/1988 | Mullendore | |
| 4,851,042 | A | 7/1989 | Bose et al. | |
| 4,863,538 | A | 9/1989 | Deckard | |
| 4,877,249 | A * | 10/1989 | Thompson | 473/349 |
| 4,938,816 | A | 7/1990 | Beaman et al. | |
| 4,992,236 | A | 2/1991 | Shira | |
| 5,062,638 | A | 11/1991 | Shira | |
| 5,154,425 | A | 10/1992 | Niskanen et al. | |
| 5,222,542 | A | 6/1993 | Burke | |
| 5,260,009 | A | 11/1993 | Penn | |
| 5,324,031 | A * | 6/1994 | Green | 473/252 |
| 5,351,952 | A * | 10/1994 | Hackman | 473/409 |
| 5,441,256 | A * | 8/1995 | Hackman | 473/409 |
| 5,441,695 | A | 8/1995 | Gladden | |
| 5,469,627 | A * | 11/1995 | Denny et al. | 33/508 |
| 5,591,091 | A * | 1/1997 | Hackman | 473/289 |
| 5,665,014 | A | 9/1997 | Sanford et al. | |
| 5,669,825 | A | 9/1997 | Shira | |
| 5,766,091 | A | 6/1998 | Humphrey et al. | |
| 5,800,632 | A | 9/1998 | Arao et al. | |
| 5,911,636 | A * | 6/1999 | Schmoll | 473/266 |
| 5,938,543 | A | 8/1999 | McGeeney et al. | |
| 5,985,208 | A | 11/1999 | Zedalis et al. | |
| 6,099,414 | A * | 8/2000 | Kusano et al. | 473/342 |
| 6,117,204 | A | 9/2000 | Saito et al. | |
| 6,122,564 | A * | 9/2000 | Koch et al. | 700/123 |
| 6,149,534 | A | 11/2000 | Peters et al. | |
| 6,261,329 | B1 | 7/2001 | Ogata et al. | |
| 6,322,746 | B1 | 11/2001 | LaSalle et al. | |
| 6,328,660 | B1 * | 12/2001 | Bunn, III | 473/257 |
| 6,364,788 | B1 | 4/2002 | Helmstetter et al. | |
| 6,410,160 | B1 | 6/2002 | Landin et al. | |
| 6,440,010 | B1 | 8/2002 | Deshmukh | |
| 6,478,842 | B1 | 11/2002 | Gressel et al. | |
| 6,508,978 | B1 | 1/2003 | Deshmukh | |
| 6,692,378 | B2 | 2/2004 | Shmoldas et al. | |
| 6,719,648 | B1 * | 4/2004 | Smith | 473/409 |
| 6,723,278 | B1 | 4/2004 | Lu et al. | |
| 6,723,279 | B1 | 4/2004 | Withers et al. | |
| 6,737,017 | B2 | 5/2004 | Woodfield et al. | |
| 6,878,074 | B2 * | 4/2005 | Byrne et al. | 473/349 |
| 6,884,486 | B2 | 4/2005 | Estrin et al. | |
| 6,966,843 | B2 * | 11/2005 | Rankin et al. | 473/202 |
| 7,041,014 | B2 * | 5/2006 | Wright et al. | 473/409 |
| 7,108,613 | B1 * | 9/2006 | Gordon et al. | 473/341 |
| 7,153,215 | B2 * | 12/2006 | Peterson et al. | 473/199 |
| 7,156,974 | B2 * | 1/2007 | Strezov et al. | 205/398 |
| 7,172,519 | B2 | 2/2007 | Byrne et al. | |
| 7,223,179 | B2 * | 5/2007 | Tsunoda | 473/324 |
| 7,229,362 | B2 * | 6/2007 | Tavares | 473/349 |
| 7,455,599 | B2 * | 11/2008 | Jones | 473/340 |
| 7,481,720 | B2 | 1/2009 | Tavares | |
| 7,628,713 | B2 | 12/2009 | Tavares | |
| 7,651,403 | B2 * | 1/2010 | Yamamoto et al. | 473/151 |
| 7,765,022 | B2 * | 7/2010 | Mazumder et al. | 700/121 |
| 7,785,218 | B2 | 8/2010 | Burnett et al. | |
| 7,887,440 | B2 * | 2/2011 | Wright et al. | 473/409 |
| 7,993,216 | B2 | 8/2011 | Lee | |
| 8,007,373 | B2 * | 8/2011 | Soracco et al. | 473/349 |
| 8,012,045 | B2 * | 9/2011 | Turner | 473/409 |
| 8,360,903 | B2 * | 1/2013 | Carlyle et al. | 473/407 |
| 2008/0235934 | A1 * | 10/2008 | Burnett et al. | 29/557 |

FOREIGN PATENT DOCUMENTS

| | | | |
|---|---|---|---|
| JP | 54074206 | A | 6/1979 |
| JP | 04308048 | A | 10/1992 |
| JP | 06063184 | A | 3/1994 |
| JP | 06296717 | A | 10/1994 |
| JP | 08257183 | A | 10/1996 |
| JP | 08260162 | A | 10/1996 |
| JP | 08308963 | A | 11/1996 |
| JP | 08308964 | A | 11/1996 |
| JP | 08308965 | A | 11/1996 |
| JP | 08318010 | A | 12/1996 |
| JP | 09154986 | A | 6/1997 |
| JP | 09287003 | A | 11/1997 |
| JP | 10158703 | A | 6/1998 |
| JP | 10168506 | A | 6/1998 |
| JP | 11009733 | A | 1/1999 |
| JP | 11099228 | A | 4/1999 |
| JP | 11104278 | A | 4/1999 |
| JP | 11137742 | A | 5/1999 |
| JP | 2000005355 | A | 1/2000 |
| JP | 2000342726 | A | 12/2000 |
| JP | 2001212270 | A | 8/2001 |
| JP | 2004-168610 | A | 6/2004 |
| WO | 9629192 | A1 | 9/1996 |
| WO | 9824574 | A1 | 6/1998 |
| WO | 0021736 | A1 | 4/2000 |
| WO | 0100892 | A1 | 1/2001 |
| WO | 0211928 | A1 | 2/2002 |
| WO | 0211929 | A1 | 2/2002 |
| WO | 2006009340 | A1 | 1/2006 |
| WO | 2006063469 | A1 | 6/2006 |
| WO | 2009036240 | A1 | 3/2009 |
| WO | 2010135344 | A1 | 11/2010 |

OTHER PUBLICATIONS

Machine Translation for JP 2004-168610 dated May 14, 2015, 17 pages.

* cited by examiner

METHOD AND SYSTEM FOR SALES OF GOLF EQUIPMENT

RELATED APPLICATIONS

This application is a continuation-in-part of U.S. patent application Ser. No. 13/192,394, filed Jul. 27, 2011, which is a continuation of U.S. patent application Ser. No. 12/468,129, filed May 19, 2009, now U.S. Pat. No. 8,007,373, all of which are incorporated herein by reference in their entireties.

FIELD OF THE INVENTION

The present invention relates to methods of making golf club components, especially club heads, using layer by layer construction, rather than conventional metal forgings or castings. The invention also provides methods and systems for selecting golf clubs and golf club components that can be constructed with the disclosed methods of making golf clubs.

BACKGROUND

Golf clubs are formed through a variety of methods. Commonly, a golf club head is forged or cast, and then machined or ground and polished to the requisite dimensions and desired aesthetic quality. The head is coupled with a golf club shaft, typically constructed from graphite (composite) or steel. Most shafts are a tapered cylindrical tube cut to a standard length with a grip on one end and an interface for the club head on the other. In order to reduce manufacturing costs to meet user price points, manufacturers use a limited number of molds to produce most of their club heads. The molds are not readily adjustable with respect to the particular characteristics of the golf club, or the player that will use them.

This manufacturing process presents a problem due to the fact that not all golfers are built the same, and not all golfers have identical swings. Because of variations in golf swings, body size, and frequency of play, many golfers would benefit from an optimization of lie angle, loft angle, club shape, club size, club weight distribution, or other club design parameters. However, altering the manufacturing process to produce individualized clubs can dramatically increase the price of the clubs, so most golfers simply settle for "off the shelf" clubs. Additionally, obtaining individualized golf clubs often involves meeting with a fitter or other professional who is aware of the club options, and can help the golfer match their needs with particular components. Using a fitter further increases the costs, and professional fitters are not available in all geographic areas.

As such, there remains a need for methods of selling and manufacturing golf clubs that allow individualized design variations while maintaining efficiency and cost effectiveness.

SUMMARY

The invention makes selecting and obtaining individualized golf club components easier while reducing the fabrication costs. Using the methods and systems of the invention, a golfer uses an interface, e.g., a web browser, to enter information about his or her golf game and body type, whereupon options are presented that are likely to improve his or her game. After the golfer has selected among the options, instructions are sent to cause the golf club components to be fabricated, e.g., with a metal sintering process. The completed personalized golf club components, e.g., clubs, are then delivered to the golfer, or the golfer obtains them from a retailer who will verify the fit of the clubs. Thus, the invention allows a larger population of golfers to benefit from individualized golf club components, increasing their enjoyment of the game.

In one instance, the invention includes a method for producing a golf club component comprising receiving golf club component selections, providing material for the golf club component and forming the golf club component layer by layer from the material. Typically, information is received from a user, the information is compared to a database correlating the information and golf club component options, and golf club component options are output to the user. The user may then select from among the options, resulting in the formation of the desired golf club components, e.g., club head. In one embodiment, a golf club head is formed by applying a controlled source of energy to a powdered metal to form a golf club head. In some embodiments, the controlled source of energy may include a direct metal laser sintering (DMLS) system, a selective laser melting system, an electron beam melting apparatus, or similar apparatus. In some embodiments other methods of forming golf club components may additionally be used, such as computerized numerical control (CNC) machining.

The invention includes a method of providing a customized golf club component by receiving a user's selection of an option and storing the selection in a tangible, non-transitory memory. A digital file with the information about a golf club component including the selected options is created by a computer processor coupled to the memory. The information is transferred to a production facility and a customized golf club component including the selected options is produced. Methods of the invention may additionally include collecting and transferring information to a production facility in addition to billing and shipping data for use in completing delivery of the desired components.

In some embodiments, the user is an individual golfer, i.e., a golf club component user. The golfer may interact with systems of the invention to choose golf club components of his or her liking, or golf club components that have been recommended based upon information provided by the golfer. Such information may include, but need not be limited to, height, weight, sex, handedness, age, geographic location, golf score handicap, and frequency of play.

In some embodiments, the user may be a designer rather than an individual golfer. The designer may select from a wide range of parameters to customize a golf club component, e.g., a golf club head. For example, the designer may select any of the following parameters: weight, weight distribution, bounce angle, lie angle, offset, loft angle, shape, hardness, sole camber, sole width, cavity undercut, center of gravity, face height, hosel outer diameter, hosel inner diameter, hosel taper, hosel depth, toe height, groove width, groove depth, and groove shape.

According to certain aspects of the invention, golf club components can be fabricated using a metal sintering process. Such processes provide nearly limitless variability in shape and size, and allow fabrication of structures that are not achievable with conventional machining, e.g., voids, interlaced materials, or weaves. The voids may include internal structure such as cells or honeycombs. The powdered metals may be used alone or in combination with other powdered metals or sinterable materials. Powdered metals suitable for use in the invention include, but are not limited to, steel, stainless steel, iron, copper, bronze, aluminum, tungsten, titanium, titanium alloy, chromium-cobalt alloy, and combinations thereof. In one embodiment, a first powdered metal may be used for a first portion of the club head, and a second powdered metal may be used for a second portion of the club head. The first powdered metal may have a density that is greater than the density of the second powdered metal. For example, the first density may be greater than the second density by about 5 g/cm³. In addition, the first density may be greater than about 10 g/cm³. Alternatively, the first density may be greater than about 7 g/cm³.

The invention additionally includes systems for selecting and fabricating golf clubs and golf club components. Systems of the invention include a processor and a computer-readable storage medium containing instructions which, when executed by the processor, cause the system to receive information from a user, compare the information to a database correlating information and golf club component options, output golf club component options to the user, receive golf club component selections, and output golf club component fabrication instructions. The system may further comprise fabrication equipment that receives golf club component fabrication instructions, provides material for the golf club component, and forms the golf club component layer by layer from the material, e.g., using a sintering process.

BRIEF DESCRIPTION OF THE DRAWINGS

Further features and advantages of the invention can be ascertained from the following detailed description that is provided in connection with the drawings described below.

DETAILED DESCRIPTION

Figure 1:
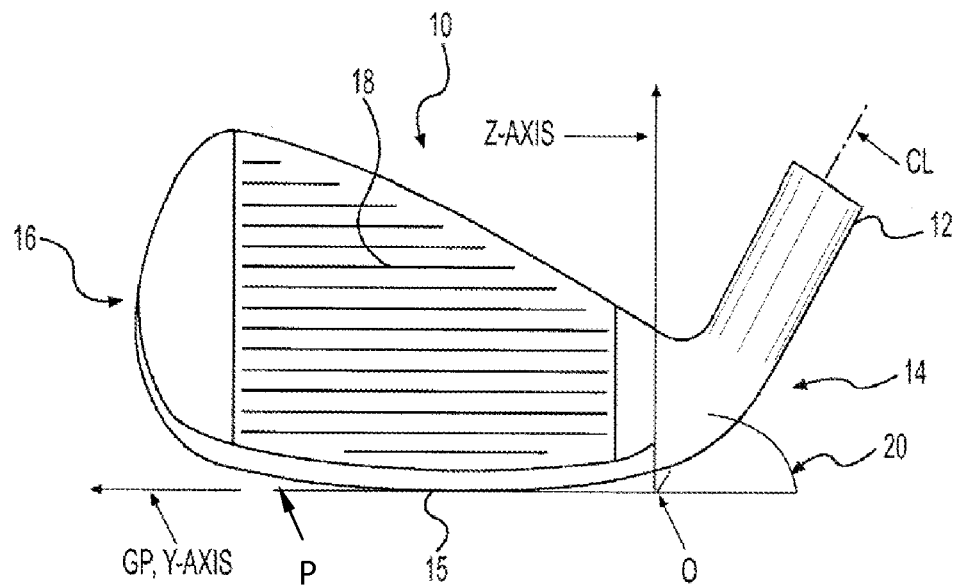
FIG. 1 is a front view of an iron type club head of the present invention.

The present invention is directed to methods and systems for selecting and fabricating individualized golf clubs or golf club components. Using an interface, such as a website or smart phone application, a user can input information about his or her preferences, golf game, and/or body, whereupon options are presented that are likely to improve his or her game. After the golfer has selected among the options, instructions are sent to cause the golf club components to be fabricated. The clubs may be fabricated from commercially-available components, or the clubs may be specially-fabricated using techniques such as machine tools and metal sintering. Using the methods and systems of the invention, the costs of selecting and fabricating personalized clubs is reduced, allowing a larger population of golfers to benefit from individualized golf club components.

Aspects of the invention involve fabricating golf clubs using an additive process. For example, powdered metal sintering and metal deposition are suitable processes for use in the present invention. The process may be used to manufacture any type of golf club head including, but not limited to: irons, woods, putters, utility clubs, and wedges.

While most golfers play with "stock" clubs purchased from a sporting goods store or pro shop, there can be substantial benefits from playing a set of custom-fit clubs. Among other benefits, custom-fit clubs provide a golfer with a proper lie angle. The lie angle of a golf club is the angle formed between the shaft axis and the ground line of the club when the club is soled in its proper playing position (address position). Typically, a taller golfer benefits from an increase in lie angle that allows the golfer to comfortably address the ball properly. In a similar fashion, a short golfer benefits from a reduction in lie angle. Accordingly, each golfer can use a natural swinging motion while maintaining a proper address when the club strikes the ball.

Methods of the invention additionally allow a user to vary the loft angle of a club head to his or her preference. The loft angle is a measurement, in degrees, of the angle at which the face of the club lies relative to a vertical plane. Using a club with a high loft angle will typically result in a golf shot with a high initial trajectory, and typically shorter distance. In contrast, utilizing a club with a low loft angle will typically result in a golf shot with a low initial trajectory and longer distance. Typically, loft angles vary from small to large across a set of irons. For example, one set of irons may have loft angles of 22°, 25°, 28°, 31°, 34°, 37°, and 41° for 3, 4, 5, 6, 7, 8, and 9 irons respectively. However, a golfer's game may benefit from other loft angles, or a different spacing of loft angles.

In order to provide properly fit clubs, portions of the club, especially the shaft and club head are specifically selected for the individual golfer. A custom-constructed set of clubs may be crafted from raw materials or modified from stock pieces. As expected, club sets that are hand-crafted from raw materials are very expensive and take a long time to produce. Thus, manufacturers typically rely on post-manufacturing methods for custom fitting golf clubs, the majority of which involve placing the club head in a vice and bending the metal until the desired specifications are met. Often, this type of adjustment will affect parameters that are not meant to be adjusted, such as bounce. Of course, multiple modifications or improper bends may result in fatigue of the metal or weakening of the club head.

Another shortcoming of using post-manufacturing methods to produce custom clubs is that it is all but impossible to reproduce a custom club if it is lost or broken. For example, a golfer's favorite club may be a forged seven iron that was customized with a post-manufacturing process based upon her swing. Upon receiving this club her short game improved dramatically and her renewed confidence allowed to achieve shots that she would not have attempted previously. Unfortunately, this particular seven iron was lost during a trip to California, and upon ordering a new custom club of the same type, she found that her short game was never the same. Because there was no quantitative record of how the first club was modified, it was impossible to recreate the same club at a later time.

Some portions of a club are easily modified for custom clubs. For example, shafts can be cut to just about any length by using simple tools, such as a hacksaw, or specialty tools such as a radial arm saw. Golf club grips also come in a wide variety of sizes, colors, and textures, allowing for easy personalization.

In contrast, fabricating certain components, e.g., the club head, require specialty tools beyond the capabilities of most professional fitters. For example, cast golf club heads require an ability to prepare and manipulate molten metal. Furthermore, producing cast club heads with the precision demanded by high-end golfers requires very expensive equipment (e.g., molds) and highly-trained workers. For this reason, most custom clubs use a selection of heads coming from a handful of facilities producing golf club heads.

Metal sintering and related processes offer an alternative to off-the shelf club heads. Powdered metal sintering systems involve a bed of metal powder that is sintered or melted layer by layer by a laser or electron beam to create metal parts. After the part has been created, the surrounding powder can be brushed away or shaken out of the part. In addition, a variety of metal powders can be melted in these systems. Metal sintering processes typically require the input of 3-D CAD files and filling a dispenser with the desired powdered starting materials. A control program converts the CAD files into instructions for controlling the layer by layer formation of the metal parts. The layer by layer formation is accomplished by laser sintering a first layer of approximately 20 to 40 micron powder onto a steel platform. The platform then lowers by approximately 20 to 80 microns, a fresh layer of powder is swept over the previously sintered layer, and the next layer is sintered or added on top of the previously built one. The additive process is repeated until the desired part is complete.

Direct Metal Laser Sintering (DMLS), for example, is a method for manufacturing custom metal parts. DMLS uses a computer-guided laser to sinter layers of powdered metal to create the desired objects. DMLS is an "additive" technology that sinters very fine powders layer by layer from the bottom up until the product is completed. A number of commercially available systems are suitable for use in the present invention. For example, the "MCP Realizer", a selective laser melting system, available from Mining and Chemical Products Limited of Germany, can create parts from any number of metals including the following powders: zinc, bronze, stainless steel, titanium, chromium-cobalt, silicon carbine, and aluminum oxide. Additionally EOS of Germany provides systems that rely on direct metal laser sintering (DMLS). ARCAM of Sweden produces machines that rely on electron beam melting (EBM) technology.

While slightly different in execution, metal deposition systems can also be used to make custom golf club components, especially golf club heads. Metal deposition systems use a 3D printing process to create metal parts in a similar manner to how ink is deposited from print heads on an inkjet printer. Multiple heads can be incorporated into these systems to increase the production speed. Metal deposition systems are currently available from FCDBIC AB of Sweden and Pro-Metal, LLC of Troy, Mich. This process may be used to create a solid part with uniform or non-uniform material properties or to add layers of powdered metal to an existing substrate. For example, a metal deposition device may be employed to coat a portion of a surface of a golf club head with a material that has a high density in order to alter the center of gravity or other design specification of the golf club head.

Generally, layer by layer fabrication procedures require 3-D CAD files, which are converted to an STL (stereolithography) file, and then the STL file instructs the machine for processing. The STL file format is widely used to describe the shape of a three dimensional object. This file format is supported by many software packages and is widely used for transferring CAD models to rapid prototyping and direct manufacturing machines. STL files are used for 3D prototyping in other media, i.e., polymers.

There are several advantages to layer by layer metal fabrication. For example, it is easy to adjust batch size and batch configuration, or mix different quantities of parts depending on the demand for particular parts without significantly affecting production cost. This flexibility allows manufactures to rapidly implement production of new parts by merely altering a CAD file or selecting a new CAD file. This is in contrast to traditional methods of manufacturing in which parts are created from specialty tools that are expensive to make. Furthermore, the volume flexibility realized with on-demand manufacturing diminishes the need to accurately forecast the quantity of each part that will be manufactured. Additionally, there is little production downtime since tool changes are not needed.

More importantly, additive processes, such as DMLS, can create undercuts or internal channels or structures in pieces that would be impossible or difficult to do with machine tools. Undercuts and other features typically require the use of a support structure, which may be made using an additive process or other known methods. Upon formation of the undercut, the support is removed. For example, the support may be formed from wood or a polymer, and subsequently heated to remove the support.

Design and testing of golf club components is also reduced using the disclosed methods. A functional prototype of a new golf club head, for example, can be directly created from CAD models, thus eliminating the need for prototype tooling. Thus, modifications to a prototype can be immediately tested for performance, durability and appearance. The development and production times of the final product are also shortened by eliminating or reducing the need for other intermediate manufacturing processes. For example, DMLS is more efficient than the casting process, because DMLS eliminates the time for creating tools, wax preparation, creating ceramic shells, pouring metal into shells, breaking shells, cutting parts off of casting trees, and grinding off parting lines and weld beads. Further, the process is capable of implementing changes in design without the need to alter or manufacture a new tool or mold. For example, a change in the design of a club head manufactured by a casting process requires the precise modification of the mold or the production of an entirely new mold. This is a time consuming and expensive process. By contrast, the powdered metal sintering process merely requires changes to be made to the CAD file, and the process will manufacture the club head based on the modified CAD file. Therefore, changes can be easily implemented by the designer without the need for a halt in production or the construction of new tools or molds.

DMLS and similar machines have further advantages over casting and forging in that DMLS can produce more consistent part sizes and shapes. Current manufacturing methods, such as casting, result in variation in part weight and size due to manufacturing tolerances and changes in environmental conditions, such as heat and humidity. Because of these inconsistencies, parts are intentionally created with extra size and weight so that they can be ground down to the proper specifications. Oversizing parts is not needed with sintering techniques, however. Since there is less hand finishing required, parts can be created closer to the net finish size, and fewer adjustments need to be made to account for the manufacturing processes. Scaling parts is also quite easy because the size can be adjusted by scaling the entire design file or by recalibrating the DMLS machine. Finally, because powdered metal sintering is an additive process, there is a significant reduction in waste resulting from material that must be cut away after molding or forging.

It is also possible to use a layer by layer fabrication process to create tooling for conventional processes such as casting, forging, stamping, and injection molding. This tooling can be created directly from the CAD data and does not require programming, e.g., as needed with CNC machine tools.

Materials

Suitable materials for use in the processes described above include powdered metals composed of particles with an average diameter of less than about 40 microns. Preferably the average diameter is less than about 25 microns. Alternatively, the average diameter may be less than about 35 microns. The average diameter may be between about 30 and about 40 microns. The powdered metal can be any powdered metal available on the market capable of being sintered and includes, but is not limited to, steels, e.g., 303 stainless steel, 304 stainless steel, 431 stainless steel, 432 stainless steel, Monel steels, Inconel steels, iron, copper, bronze, brass, aluminum, magnesium, nickel, tungsten, chromium, cobalt, chromium-cobalt alloys, titanium and titanium alloys, or similar materials and combinations thereof. The materials may also be combined with other materials to vary the composition of portions of the club head to achieve a desired characteristic for a particular portion. For example, 303 stainless steel may be used for the body portions of the club head including the top line, heel, toe, and sole portions of the club and a titanium alloy may be used to produce the face portion of the club head. In some embodiments, non-metals, such as polymers or foams may be incorporated into the club designs and used with the layer by layer fabrication processes.

Club Design

The club design process includes selecting a set of design parameters to match specifications of a specific golfer, providing a powdered metal, and applying energy to the powdered metal to form the club head. In one embodiment a powdered metal sintering process, such as DMLS, is used to form a club head. Other custom processes, such as CNC machining or 3D printing may also be used. Typically, the designer inputs a design from a CAD file or a CAD file is output in response to information received from a user (see below). However, in some embodiments, the system may include a library of existing CAD files or a parametric CAD file that can be modified by inputting a set of new design parameters. A parametric CAD file includes a basic shape of the club head, and a designer/user selects from a list of parameters to customize the club accordingly. The parameters may include, but are not limited to: density, weight distribution, bounce angle, lie angle, offset, loft angle, hardness, sole camber, sole width, cavity undercut, center of gravity, face height, hosel outer diameter, hosel inner diameter/taper, hosel depth, toe height, groove width, groove depth, and groove shape, or combinations thereof.

Referring to FIG. 1, a club head 10 of the present invention has a typical iron type club head shape that includes hosel 12, sole 15, heel 14, and toe 16. A ball striking face 18 optionally has a plurality of parallel, horizontally disposed grooves formed in the surface of the face 18. A lie angle 20 is defined by the center line (CL) of hosel 12 and the horizontal plane (OP) on which the club rests when addressing the ball. The lie angle, in conventional club manufacturing processes, is set when the clubs are forged or cast, and in general, the factory set lie angle is suitable for some golfers, but not all. In forged and cast clubs, the hosel must be bent relative to the remainder of the club head to change the lie angle to suit a particular golfer. In the present invention, the lie angle is one of the parameters that can be customized for each club head of each set to suit the specifications of an individual golfer. Similarly, the bounce angle is defined by the leading edge of the club head, the sole of the club, and the ground. That is, the bounce angle is an indication of how much the sole of the head lifts the leading edge when the club strikes the ground. This angle can also be adjusted by custom fitting steps, in the prior art, after forging or casting. In the present invention, the bounce angle is another parameter that can be customized for an individual golfer without subsequent processing steps, such as bending, grinding or otherwise working the metal which comprises the club head.

A particularly useful aspect of the powdered metal sintering process is the ability to control the density of various portions of the club head. Varying the density of certain portions of the club head allows the designer to distribute mass throughout the club head in order to control characteristics of the club head such as the center of gravity and moment of inertia. Density control may be accomplished in a variety of ways.

Figure 2:
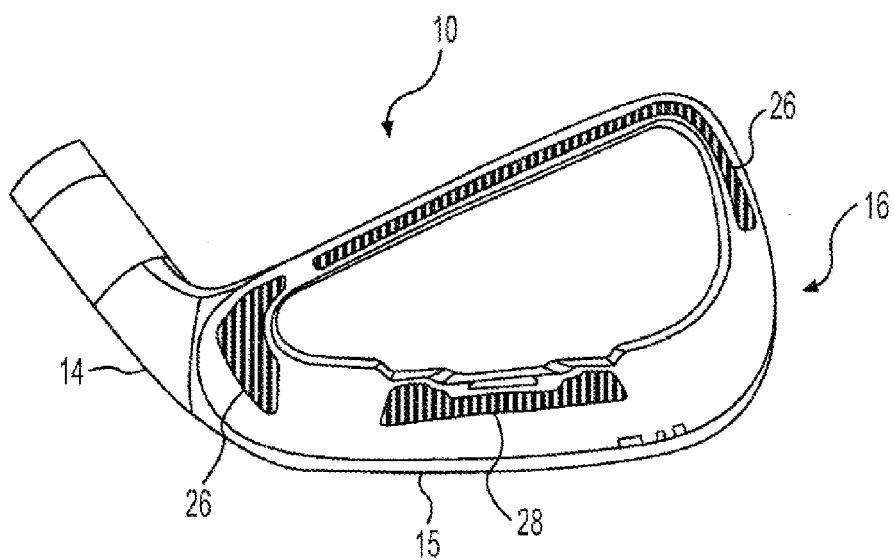
FIG. 2 is a rear view of a cross section of a club head of the present invention.

In one embodiment, the process uses at least two different powdered metals or alloys to form the club head. Regions of higher and lower density material, or regions of different materials, can be used to change the center of gravity of the club head, or otherwise redistribute weight in a manner intended to improve playability of the clubs. Referring to FIG. 2, a region of low density material 26 is formed in the topline, heel, and upper toe portions of the club head, and a region of high density material 28 is formed in the lower portion of the club head, thereby achieving a lower center of gravity.

Although, FIG. 2 only shows one orientation of density distribution, the high and low density portions may be distributed in a variety of ways to achieve a desired specification. For example, a material with a high density may be used in one or more "heavy" portions, and a material with a low density may be used in one or more "light" portions. The heavy portions may be formed from a material with a density greater than about 1 $g/cm^3$. According to one aspect of the invention, the heavy portions may be formed from a material with a density greater than about 3 $g/cm^3$. In one embodiment, the heavy portions may be formed from a material with a density greater than about 7 $g/cm^3$. In one embodiment, the heavy portions are formed from a material with a density greater than about 10 $g/cm^3$. In another embodiment, the heavy portion is composed of a material with a density that is greater than about 15 $g/cm^3$, e.g., about 18 $g/cm^3$ In addition, the heavy portion may have a density that is greater than the light portion(s) by at least about 1 $g/cm^3$. In another embodiment, the heavy portion has a density that is greater than the light portion by about 3 $g/cm^3$. The heavy portion has a density that is greater than the light portion by about 5 $g/cm^3$. Alternatively, the material of the heavy portion may have a density that is greater than the material of the light portion by about 10 $g/cm^3$.

In another embodiment, the density of various portions of the club head is controlled by varying the porosity of the sintered metal. Porosity is a measure of the void spaces in a material, and is measured as a fraction, between 0-1, or as a percentage between 0%-100%. For example, by controlling the amount of powder, it is possible to control the density, in terms of porosity, of the particular powdered metal used in the process. Typically, when a metal part is manufactured, it is expected that the finished product has approximately 0% porosity, with limited inclusions.

By using the formation methods of the present invention, it is possible to change the porosity of the material, layer by layer, area by area, to achieve a desired density. This is accomplished by varying the amount of powdered metal used for certain areas of the club head. A reduction in the amount of powder used for a particular layer results in a layer with a greater porosity and a lower density. Instead of varying the density or porosity it is also possible to fabricate structures with internal voids, such as cells or honeycombs, discussed in greater detail below.

Additionally, while not shown explicitly in FIGS. 1 and 2, the fabrication methods of the invention allow for the formation of mating and adjustable portions of golf club components, e.g., club heads. For example, the club heads in FIGS. 1 and 2 may include indexed notches or other features allowing the club head to be adjusted by a user, or to interface with an adjustable component. The club heads may also include through holes which run the length of the hosel and allow the club head to be mated with other components, e.g., shafts, selected by a user or designer. The club heads may include tapped holes or fastener assemblies for club construction.

Figure 3:
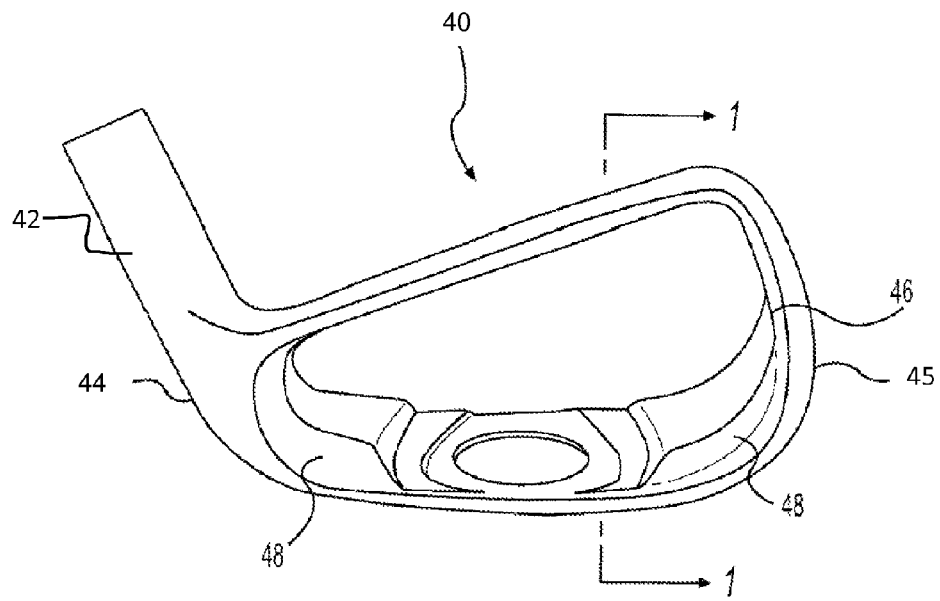
FIG. 3 is a rear view of a club head of the present invention.

Referring to FIG. 3, a club head 40 has a hosel 42, a heel 44 and toe 45. The rear surface is shaped to have a centrally located low density portion 46 surrounded by a higher density portion 48. In effect, club head 40 behaves similar to a cavity-back type club because the orientation of low density portion 46 allows for mass to be freed up and distributed towards the perimeter of the club head. This orientation leads to an increase in the moment of inertia (MOI) of the club head. (Inertia is a property of matter by which a body remains at rest or in uniform motion unless acted upon by some external force. MOI is a measure of the resistance of a body to angular acceleration about a given axis, and is equal to the sum of the products of each element of mass in the body and the square of the element's distance from the axis.) Thus, as the distance from the axis increases, the MOI increases, making the club more forgiving for off-center hits. In addition, moving or rearranging mass to the club head perimeter enlarges the sweet spot and produces a more forgiving club.

Figures 4, 5:
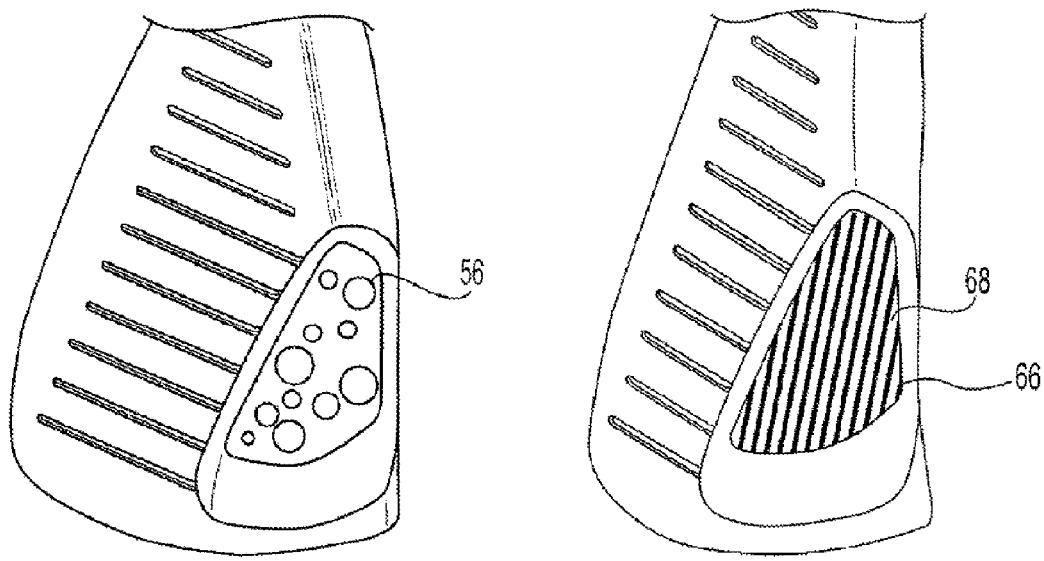
FIG. 4 is a cross sectional view of a club head of the present invention taken along 1-1 of FIG. 3.
FIG. 5 is a cross sectional view of a club head of the present invention taken along 1-1 of FIG. 3.

For example, the porosity and the density may be altered using a DMLS process. The process may be programmed to space lines of material placed on a substrate to form a layer. The program may allow for a wide space between the lines, which results in a layer formed from less powder. This process forms a layer with a high percentage of porosity and low density. By contrast, a layer may be formed wherein the DMLS process is programmed to place little or no space between the lines. The lack of space between the lines results in a layer that is formed with a low porosity and a high density. FIG. 5 shows an example of the interior of a club head where spaces 66 and lines of material 68 form the interior of a club head.

Another method of increasing porosity is to program the process to leave pockets or voids where no material is placed on the substrate. FIG. 4 shows the interior of a club head where voids 56 contain no material. In some embodiments, a hollow club head may be created using the powdered metal sintering process in combination with a conventional method. Portions of the club head may be made according to the process described above, and subsequently the portions are joined by a welding process. For example, a front portion may include the face and the sole, and a back portion may be welded to the front portion in a manner that creates a hollow area between the front and back portion. Club heads having hollow portions may also have weights added to the hollow portion to change the mass distribution of the club.

In one embodiment, voids or spaces are formed by programming a process as outlined above. The voids may be interconnected throughout the club head. In other embodiments, one or more of the voids or spaces are filled with a light weight polymer or other low density material. Alternatively, the interior of the club head may comprise a skeleton or frame made with a high porosity. A low density material may then be injected to fill the areas in and around the frame. The low density material may have a density that is less than about 1.3 g/cm$^3$. In one embodiment, the low density material is an expanding foam that fills the voids and provides vibration dampening.

In one embodiment, a first amount of material is used for the formation of layers for a first portion of the golf club head, and a second amount of material may be used for the formation of layers for a second portion of the golf club head. The first amount of material is less densely packed than the second amount of material, resulting in a club head with a first portion that is more porous than the second portion. Therefore, the density of the first portion is less than the density of the second portion. This allows for a lighter overall structure, freeing up weight to optimize performance characteristics of the golf club. In some embodiments the center of mass of the club head can be moved away from the hosel using these design techniques, therefore increasing the moment of inertia. In one embodiment, the first portion may comprise about 1% to about 99% of the entire volume of the club head. The first portion may comprise about 5% to about 95% of the entire volume of the club head. In another embodiment the first portion may comprise at least about 95% of the total club head volume. In another embodiment, the first portion of the club head may comprise greater than about 85% of the total volume of the club head. For example, the first portion may comprise the interior of the club head and the second portion may comprise only the surface of a portion of the club head. In one embodiment the surface of the club head is less than about 0.050 in. thick. Alternatively, the surface of the club head is less than 0.040 in. thick. In another embodiment, the surface is about 0.030 in. thick. In addition, the porosity of the first portion may range from about 99% porosity to about 1% porosity. In one embodiment, the porosity of the first portion ranges from about 95% to about 5%. Alternatively, the porosity of the first portion may be greater than 90%. The porosity of the first portion may range from about 20% to about 80%. In another embodiment, a third portion may be formed that has a porosity that is greater than the first porosity, which results in a greater density for the first portion in comparison to the third portion.

Another aspect of the present invention uses a metal deposition process to coat a substrate with powdered metal. For example, an existing part or club head may be inserted into the metal deposition apparatus, and a coating material is applied to part of the club head. This process may be used to apply a protective layer over parts of the club that come into contact with objects. For example, the sole of the club may be coated with a material that is harder than other parts of the club in order to prevent damage from repeated impacts with the ground. In one embodiment, the designer uses the metal deposition process to coat selected portions to achieve a desired club attribute such as center of gravity, moment of inertia, hardness, or other club characteristic. For example, a high-density material may be deposited onto the heel portion of the club in order to move the center of gravity toward the heel of the club. The modification techniques described for the powdered metal sintering process are also applicable in the metal deposition process. Specifically, the density, hardness, and weight distribution can be modified by utilizing powdered metals of different densities and/or varying the porosity of the sintered metal.

In other embodiments, a low density substrate may be coated with a powdered metal to create a desired structure. The substrate may be a polymer or may be non-metallic in nature. For example, a low density polymer can be coated with a powdered metal to form a club head. As a result, the club head is made lighter and mass can be added to desired locations to achieve various specifications such as moment of inertia, center of gravity, hardness, or other characteristic. In other embodiments, a portion of a substrate may be coated with a metallic coating by utilizing a vapor deposition or chemical deposition process in combination with a metal deposition process.

Systems for Selecting and Fabricating Clubs

The invention additionally includes systems for selecting and fabricating golf club components. Using such systems a user, e.g., a golfer, can design and have fabricated a wide variety of golf equipment ranging from a specially-constructed club head to a full set of clubs with combinations of desired components. In many instances, systems of the invention will allow "average" golfers to experience the benefits of professional fitting and custom clubs. That is, such systems can be used to select, fabricate, and deliver individualized golf club components that help the user to improve his or her golf game. In some embodiments, systems of the invention include the fabrication equipment, e.g., DMLS, used to create customized components using layer by layer fabrication. In other embodiments, systems of the invention result in the output of design parameters that are used by a fabricator to produce the desired golf club components.

Figure 6:
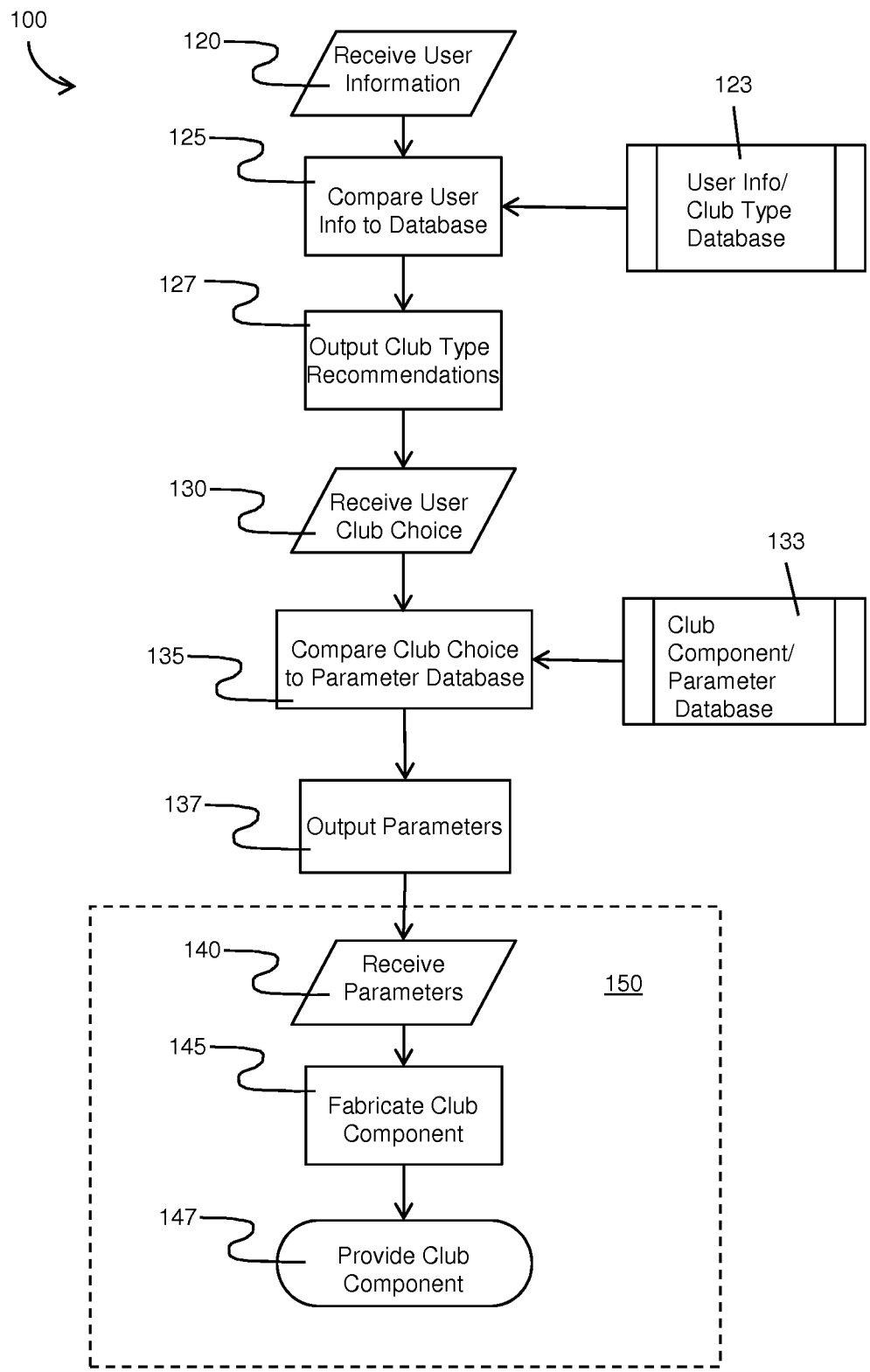
FIG. 6 is a flow chart describing a system of the invention.

A system for selecting golf club components 100 according to an embodiment of the invention is shown in FIG. 6. Beginning at step 120 information is received from a user. A user may be the end user of the golf components, e.g., a golfer, or the user may be a professional fitter or other golf professional. The user may enter any of the below-listed information, as it would be helpful in determining the best golf club component for the user or assuring that the selected golf club components are to the user's liking and delivered to the user (or a third party) in a timely manner. The information may be selected from: name, address, height, weight, sex, handedness, age, geographic location, golf score handicap, physical limitations, annual income, frequency of play, frequency of airline travel, favorite color, alma matter, current clubs or any combination thereof. A user may input additional information relevant to a selection of golf club components, such as a preference for any of the following: golf club head type, golf club shaft type, golf club shaft length, golf club grip type, golf club loft angle, golf club lie angle, golf club head weight, golf club head size, golf club head volume, golf club head shape, golf club shaft shape, golf club head center of gravity, golf club head face size, golf club head color, golf club shaft color; golf club grip color, golf club insignia, golf club head medallion, number of clubs.

In advanced embodiments, a user may upload still or moving images of a golf swing, e.g., a video of the user swinging a golf club. The user may provide information about ball trajectories or flight distances. In some embodiments, the ball trajectory information may be provided by an optical, IR, or ultrasonic camera, or from a pressure pad, e.g., information from a golf simulator. In advanced embodiments that receive images or flight data, additional components of the system (not shown) may analyze the images or flight data to produce metrics used in subsequent steps to output club type recommendations.

At step 125, the information provided by the user is compared to a database 123 relating player information and golf club components. Based upon the comparison step 125, one or more golf clubs, or golf club components, are output to the user at step 127. Steps 125 and 127 are optional, however, as a system 100 of the invention may simply require the user to input information which is received at 120 and then the system proceeds to step 130 where a user club choice is received (described below).

The database 123 provides club component options based upon information provided by the user. A variety of databases 123 may be used with systems 100 of the invention. For example, the database 123 may be as simple as a look-up table relating shaft length to golfer height. In other instances, the database 123 may correlate different styles of club heads with user information about age and golf score handicap. In advanced embodiments, database 123 may comprise algorithms that suggest particular types of club components based upon combinations of user information. For example, values of height, weight, age, sex, handedness, and handicap may be combined to produce a value for comparison to the database.

At step 130, user choices of golf clubs or golf club components are received. The choices may be selected from the recommendations output in step 127, or club component choices may be received independently of the recommendations. The user choices may include any of the following: golf club head type, golf club shaft type, golf club shaft length, golf club grip type, golf club loft angle, golf club lie angle, golf club head weight, golf club head size, golf club head volume, golf club head shape, golf club shaft shape, golf club head center of gravity, golf club head face size, golf club head color, golf club shaft color; golf club grip color, golf club insignia, golf club head medallion, number of clubs.

Additionally, a software interface can allow the user to morph shapes to his/her liking. An algorithm then computes the expected mass properties and advises the user of end results. Also, the algorithm may highlight areas to add material (or volume), and areas to remove material to achieve desired characteristics. Starting templates can be utilized to help quickly shape the club. Virtual construction lines can be used to graphically illustrate dimensional limits, or boundaries for preventing the user from creating non-conforming clubs according to the USGA and/or R&A rules, as well as exceeding traditional design guidelines with respect to head weight. Personalization features can be graphically incorporated and erased. Photorealistic rendering can be utilized to give realistic feedback of the final product.

A byproduct of such an approach to manufacturing and selling clubs this way is the creation of a historic database. Should the user ever lose her golf club, or damage it beyond repair, an exact replica can be produced for replacement. Additionally, it is easily possible for a friend to order an exact replica if she likes the club.

At step 135, the golf club component selections are compared to a database 133 correlating club components to a parameter database. The parameters may include specific information about golf club components or entire clubs. For example, database 133 may include combinations of stock components (shafts, grips, club heads) that can be assembled to produce a golf club of the user's choosing. Thus, a user selection of a golf club can be correlated with specific components and instructions needed to construct the club. In some embodiments, the parameters include schematics, for example, computer-aided drafting (CAD) files, that can be used to fabricate, form, or construct clubs or club components. The parameters may include specific materials, tolerances, etc. to accompany the schematics. The parameters may include instructions or computer code for controlling machines used to fabricate clubs or club components, for example computer numerical control (CNC) machines or metal sintering machines. In preferred embodiments, the design files include specifications for forming a golf club head, e.g., an iron-type golf club head, using a machine that forms the golf club head layer by layer from a material, e.g., a powdered metal.

In some embodiments of the system 100, parameters regarding the golf club or golf club components, e.g., design files, are output at step 137. Typically, the parameters will not be output to the user, but rather they will be retained for order fulfillment or sent to a third party, such as a fabricator, manufacturer, or assembler.

In preferred embodiments, the output parameters are sent to a fabricator 150 (dashed box) where the golf club or golf club components will be fabricated. In some embodiments, the fabricator 150 is owned by the owner of the system, i.e., the entity that controls the servers (discussed below) used to perform the recited steps. In other embodiments, the fabricator is independent of the owner of the system, but the actions of the fabricator are controlled by the owner of the system, either by contract or because the fabricator is acting as an agent of the owner of the system. Thus, the system 100 can be seen to include steps 140, 145, and 147 in box 150 even when the fabricator 150 is geographically or legally separate from the owner of the system 100.

At step 140, the fabricator receives parameters of the golf clubs or golf club components that were selected by the user. Using the parameters, the fabricator then fabricates the golf clubs or golf club components at step 145. The fabrication process may include casting, forging, bending, stamping, cutting, milling, polishing, plating, grinding, welding, drilling, gluing, extruding, injecting, or sintering. In preferred embodiments, the fabricating step 145 includes sintering a golf club head by applying a controlled source of energy to the material layer by layer, such as described above. Using such a sintering process, a wide variety of club shapes and configurations can be constructed, even shapes that are not attainable using conventional machine tools. For example, using sintering processes, it is possible to form a club head having a void. Sintering processes may be used in combination with other processes, for example cutting, welding, or polishing, etc. Components of clubs that are specially fabricated for the user may be combined with other components that are "off the shelf," for example, a commercially-available golf club grip.

Once the fabrication process is complete, the club component is provided in step 147. The component may be provided to the user directly, e.g., via direct shipping, or the component may be provided to an assembler who will combine the fabricated component with other fabricated components or other commercially-available components to achieve the user club choice. In some instances, the provided component may be packed, e.g., in a box, and labeled for delivery.

Figure 7:
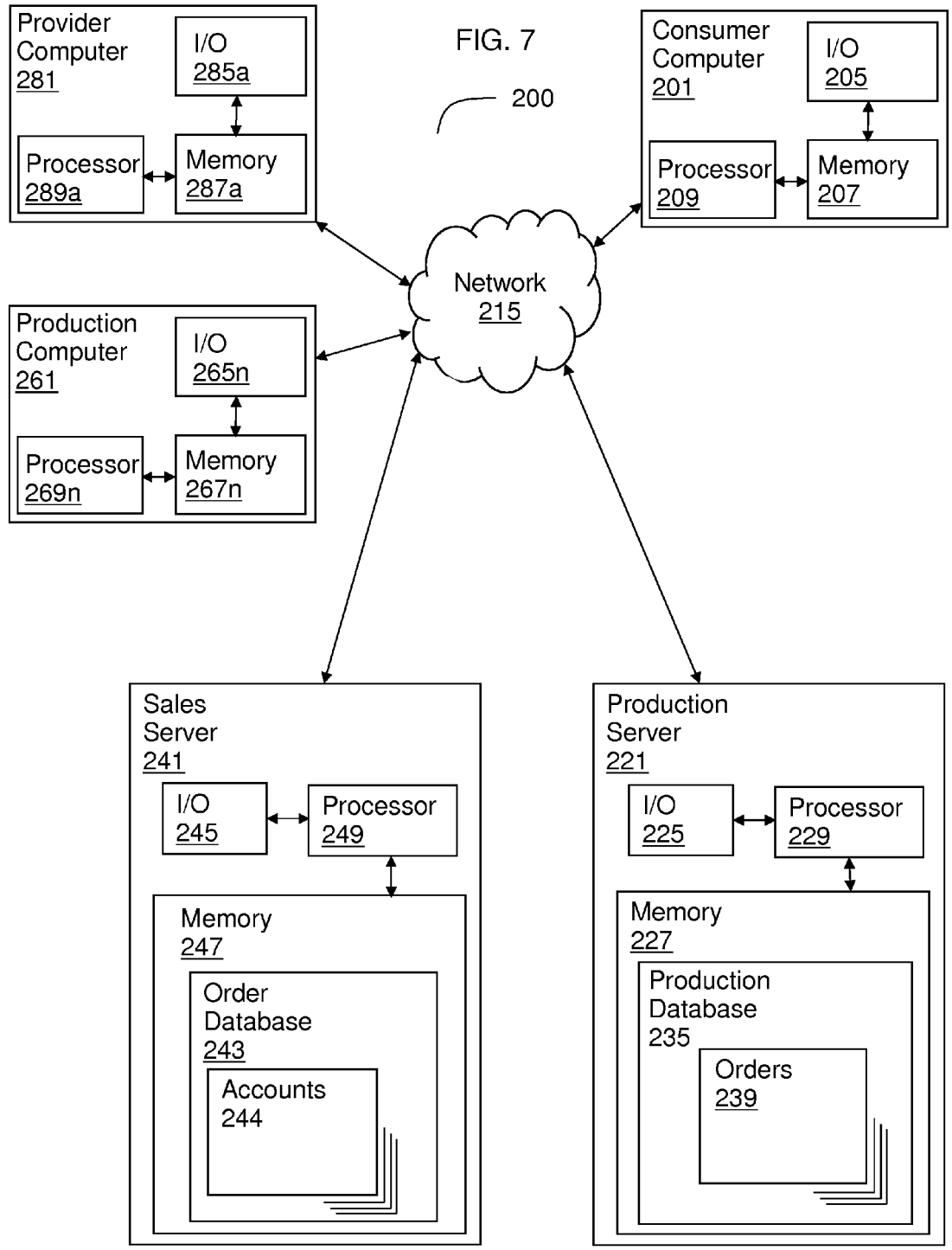
FIG. 7 is a block diagram of a system for providing a customized club head or golf club.

A system of the invention will include at least a processor and a computer readable medium having instructions for the processor to carry out tasks according to methods of the invention. However, in practice, a system of the invention will typically include other components such as graphical interfaces, input/output devices, transitory computer readable media, and a network. Systems of the invention may additionally include fabrication equipment, such as DMLS equipment. FIG. 7 shows components in an exemplary system for selecting customized golf clubs or golf club components. As shown in FIG. 7, system 200 generally includes one or more computers, communicably coupled via a network 215. Systems and methods of the invention may generally be implemented through the use of one or more computers such as any combination of a provider computer 281, a production computer 261, and a user computer 201 along with, for example, a sales server 241 and a production server 221. A computer generally includes a processor (e.g., 209, 289a, 269n, 249, 229) operably coupled to a memory (e.g., 207, 287a, 267n, 247, 227) and configured to send or receive information via an input-output device (e.g., 205, 285a, 265n, 245, 225).

One of skill in the art will recognize that a processor may be provided by one or more processors including, for example, one or more of a single core or multi-core processors (e.g., AMD Phenom II X2, Intel Core Duo, AMD Phenom II X4, Intel Core i5, Intel Core i & Extreme Edition 980X, or Intel Xeon E7-2820). In certain embodiments, any of user computer 201, provider computer 281, production computer 261 may be a notebook or desktop computer sold by Apple (Cupertino, Calif.) or a desktop, laptop, or similar PC-compatible computer such as a Dell Latitude E6520 PC laptop available from Dell Inc. (Round Rock, Tex.). Such a computer will typically include a suitable operating system such as, for example, Windows 7, Windows 8, Windows XP, all from Microsoft (Redmond, Wash.), OS X from Apple (Cupertino, Calif.), or Ubuntu Linux from Canonical Group Limited (London, UK). In some embodiments, any of user computer 201, provider computer 281, production computer 261 may be a tablet or smart-phone form factor device and processor 281 can be provided by, for example, an ARM-based system-on-a-chip (SoC) processor such as the 1.2 GHz dual-core Exynos SoC processor from Samsung Electronics, (Samsung Town, Seoul, South Korea).

In some embodiments, either of sales server 241 or production server 221 can be a Hitachi Compute Blade 500 computer device sold by Hitachi Data Systems (Santa Clara, Calif.). Either of processor 249 or processor 229 can be, for example, a E5-2600 processor sold under the trademark Xeon by Intel Corporation (Santa Clara, Calif.).

Input-output devices generally includes one or a combination of monitor, keyboard, mouse, data jack (e.g., Ethernet port, modem jack, HDMI port, mini-HDMI port, USB port), Wi-Fi card, touchscreen (e.g., CRT, LCD, LED, AMOLED, Super AMOLED), pointing device, track pad, microphone, speaker, light (e.g., LED), or light/image projection device.

In certain embodiments, a user's selection of options is received via the user's use of user computer 201 and the selection is received at sales server 241 and stored in memory 247. Sales server 241 uses a network card for input/output 245 to received data. Sales server 241 maintains order database 243 which may include accounts 244 where user information is stored (e.g., for payment and delivery information).

After orders are received and ready for production, digital files can be transferred via input/output 245 from sales server 241 to production server 221 via input/output 225, which may also be a network card or other data transfer mechanism. Order information (e.g., orders 239) is stored in production database 235 in memory 227. Processor 229 executes computer program instructions stored in memory 229 to perform order batching and to initiate production.

A production facility may be equipped with a production computer 261 which either automatically coordinates the operation of machines or provides information to production employees, e.g., via input/output 265n, which could include, for example, a monitor or laser printer. The production computer 261 may also be directly connected to fabrication equipment, such as metal sintering equipment or CNC machine tools.

Many of the steps and functions described herein can be planned or coordinated by a provider personnel using provider computer 281. For example, engineers or sales personnel can prepare and upload information (e.g., digital files such as in a comma-separated values (CSV) format) that, for example, lists options for features for user selection. That is, in certain embodiments, provider personnel use provider computer 281 to "set up" what options are available, for example, within a display such as the one shown in FIG. 8. Such uploaded information may be saved in memory 247 on sales server 241 and can be used, for example, by processor 249 to cause a display to be rendered such as that shown in FIG. 8 on input/output 205 on user computer 201. Input/output 205 can include a monitor displaying a view of a web browser. A user's selection of options can be stored in one of accounts 244 in order database 243 by writing a file in memory 247.

Memory generally refers to one or more storage devices for storing data or carrying information, e.g., semiconductor, magnetic, magneto-optical disks, or optical disks. Information carriers for a memory suitable for embodying computer program instructions and data include any suitable form of memory that is tangible, non-transitory, non-volatile, or a combination thereof. In certain embodiments, a device of the invention includes a tangible, non-transitory computer readable medium for memory. Exemplary devices for use as memory include semiconductor memory devices, (e.g., EPROM, EEPROM, solid state drive (SSD), and flash memory devices e.g., SD, micro SD, SDXC, SDIO, SDHC cards); magnetic disks, (e.g., internal hard disks or removable disks); magneto-optical disks; and optical disks (e.g., CD and DVD disks). Memory may also be external to the device and reside on a server or disk in an alternative location, i.e., "the cloud." The processor and the memory can be supplemented by, or incorporated in, special purpose logic circuitry.

The subject matter described herein can be implemented in a computing system that includes a back-end component (e.g., sales server 241 or production server 221), a middleware component (e.g., an application server or sales sever 241), or a front-end component (e.g., user computer 201 having a graphical user interface or a web browser through which a user can interact with an implementation of the subject matter described herein), or any combination of such back-end, middleware, and front-end components. The components of the system can be interconnected through network 215 by any form or medium of digital data communication, e.g., a communication network. Examples of communication networks include cell network (e.g., 3G or 4G), a local area network (LAN), and a wide area network (WAN), e.g., the Internet.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include instructions written in any suitable programming language known in the art, including, without limitation, C, C++, Perl, Java, ActiveX, HTML5, Python, Ruby on Rails, Visual Basic, or JavaScript. In certain embodiments, systems and methods of the invention are implemented through the use of a mobile app. As used herein, mobile app generally refers to a standalone program capable of being installed or run on a smartphone platform such as Android, iOS, Blackberry OS, Windows 8, Windows Mobile, etc. Functionality of the invention can be implemented by a mobile app or a software application or computer program in other formats included scripts, shell scripts, and functional modules created in development environments.

A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

A file can be a digital file, for example, stored on a hard drive, SSD, CD, or other tangible, non-transitory medium. A file can be sent from one device to another over network 215 (e.g., as packets being sent between a server and a client, for example, through a Network Interface Card, modem, wireless card, or similar).

Writing a file according to the invention involves transforming a tangible, non-transitory computer-readable medium, for example, by adding, removing, or rearranging particles (e.g., with a net charge or dipole moment into patterns of magnetization by read/write heads), the patterns then representing new collocations of information about objective physical phenomena desired by, and useful to, the user (e.g., a physical arrangement of particles that indicates that a specific, new club head is to be constructed from a certain set of multiple components and sent to a user). In some embodiments, writing involves a physical transformation of material in tangible, non-transitory computer readable media (e.g., with certain optical properties so that optical read/write devices can then read the new and useful collocation of information, e.g., burning a CD-ROM). In some embodiments, writing a file includes transforming a physical flash memory apparatus such as NAND flash memory device and storing information by transforming physical elements in an array of memory cells made from floating-gate transistors. Methods of writing a file can be invoked manually or automatically by a program or by a save command from software or a write command from a programming language.

Figure 8:
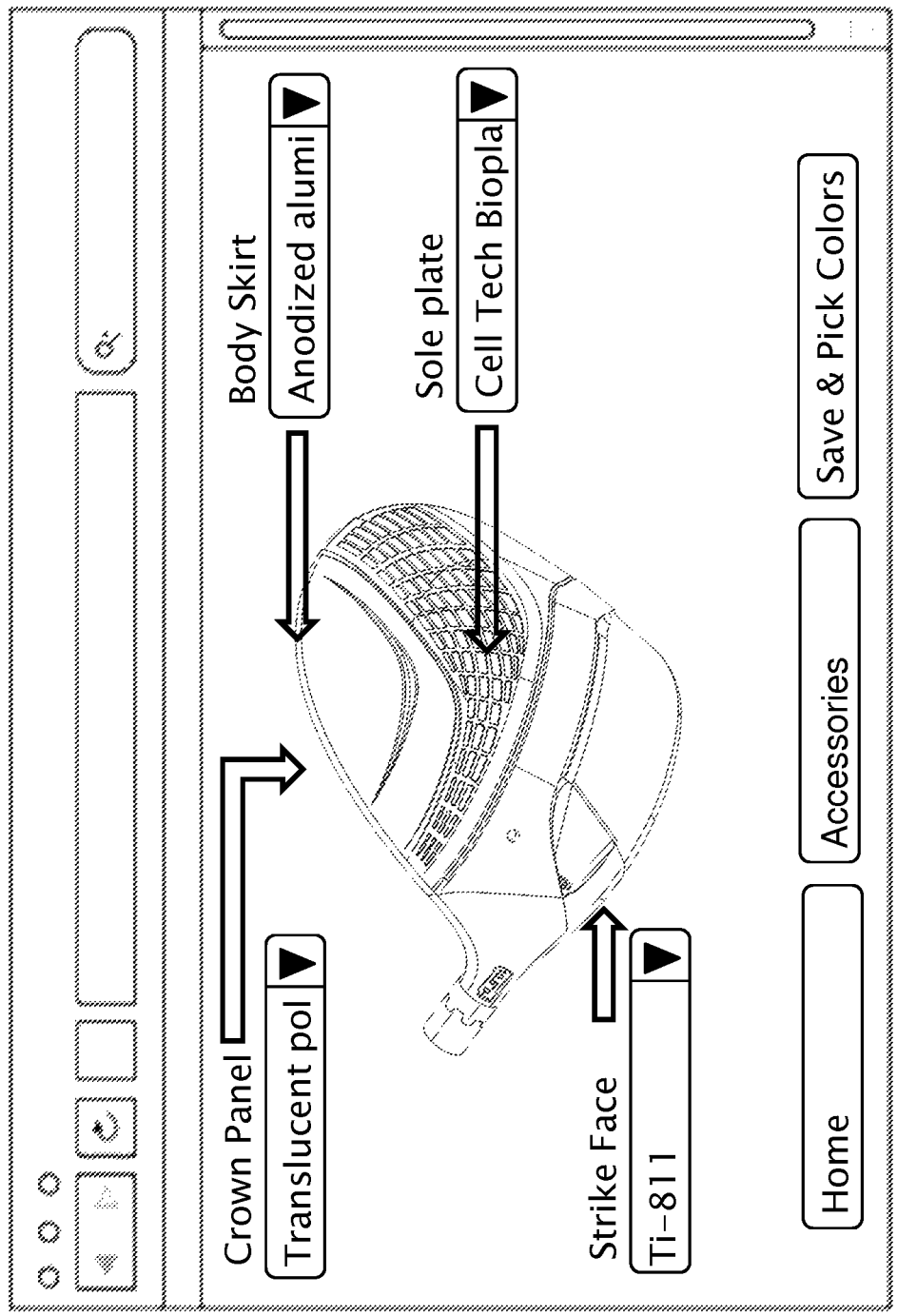
FIG. 8 shows a display for receiving option selections.

An embodiment for a user interface for a system of the invention is shown in FIG. 8. The interface may be a website, a smart phone or tablet application. Using the interface, a user can select properties of a customized head that will be fabricated and provided to the user or assembled into a golf club. The interface can include options for multiple features that are available with a club head. The interface can receive selections from a user of various options and then retrieve suitable design parameters for fabricating the customized head. FIG. 8 generally shows an exemplary display as could be shown on a screen, for example, of a computer or smartphone, discussed in more detail below. In certain embodiments, FIG. 8 represents a display rendered in a web browser (e.g., a web page being displayed by Internet Explorer, Safari, or Google Chrome).

As shown in FIG. 8, the interface can include elements such as pull-down menus for choosing options. Any method of offering options and receiving selections is included, such as, for example, point-and-click selection, keyboard entry, radio buttons, and confirmation of suggested options. A selection of an option can include selecting a given option from a set of possibilities and it can also include selecting whether or not to include a certain feature at all. For example, a user can be offered whether or not they would like a removable crown panel on their club head and, if they choose so, they can then be offered a list. Options can be offered and selections received for any aspect of a club head including all of those discussed herein. For example, the choices of crown panel materials in FIG. 8 could include clear plastic, translucent plastic, composite, carbon fiber, titanium, aluminum, or other alloys.

The same or other interfaces will provide the user with a variety of design choices with respect to a number of components (e.g., shaft, grip, head). A plurality of interfaces may be used to design a set of clubs or a single interface can be used to select, e.g., shaft and grip, and then a plurality of nested interfaces or pop-ups can be used to select individual club heads for the set. A user could be offered choices of bodies and body materials. Choices of certain bodies may govern the availability of certain other choices. For example, some bodies may have a forward member for supporting a strike face and a body skirt member upon which a crown panel and sole plate are to be installed. Where a user chooses such a body, they may then be offered a choice of sole plate (e.g., with choice of style, material, color, etc.). Other features a user could choose include overall finish of surface (e.g., anodized, painted, decal set), strike face, removable/interchangeable weight members, reconfigurable shaft, setting indicator window, user-uploaded photo printed on surface (e.g., as uploaded digitally), number of club heads (e.g., user orders entire set or matching clubs/sets for whole families), etc.

As shown in FIG. 8, receiving user options can be done via a series of related screens. For example, a user can choose materials for parts in a first screen, choose optional accessories in another screen, and save their choices and pick colors in another screen. However, in other embodiments, all choices are made on a single screen or a different combination of screens. In certain embodiments, choices are offered based upon input information such as height, weight, and age (discussed above). In certain embodiments, choices are suggested based on inferences made according to computer program rules about a user's likely preference. For example, if a user orders a shaft in a given color (e.g., orange), a club head can be shown and suggested with a given matching or complementary color (e.g., orange main material with blue contrast finish details, or all green panels).

Figure 9:
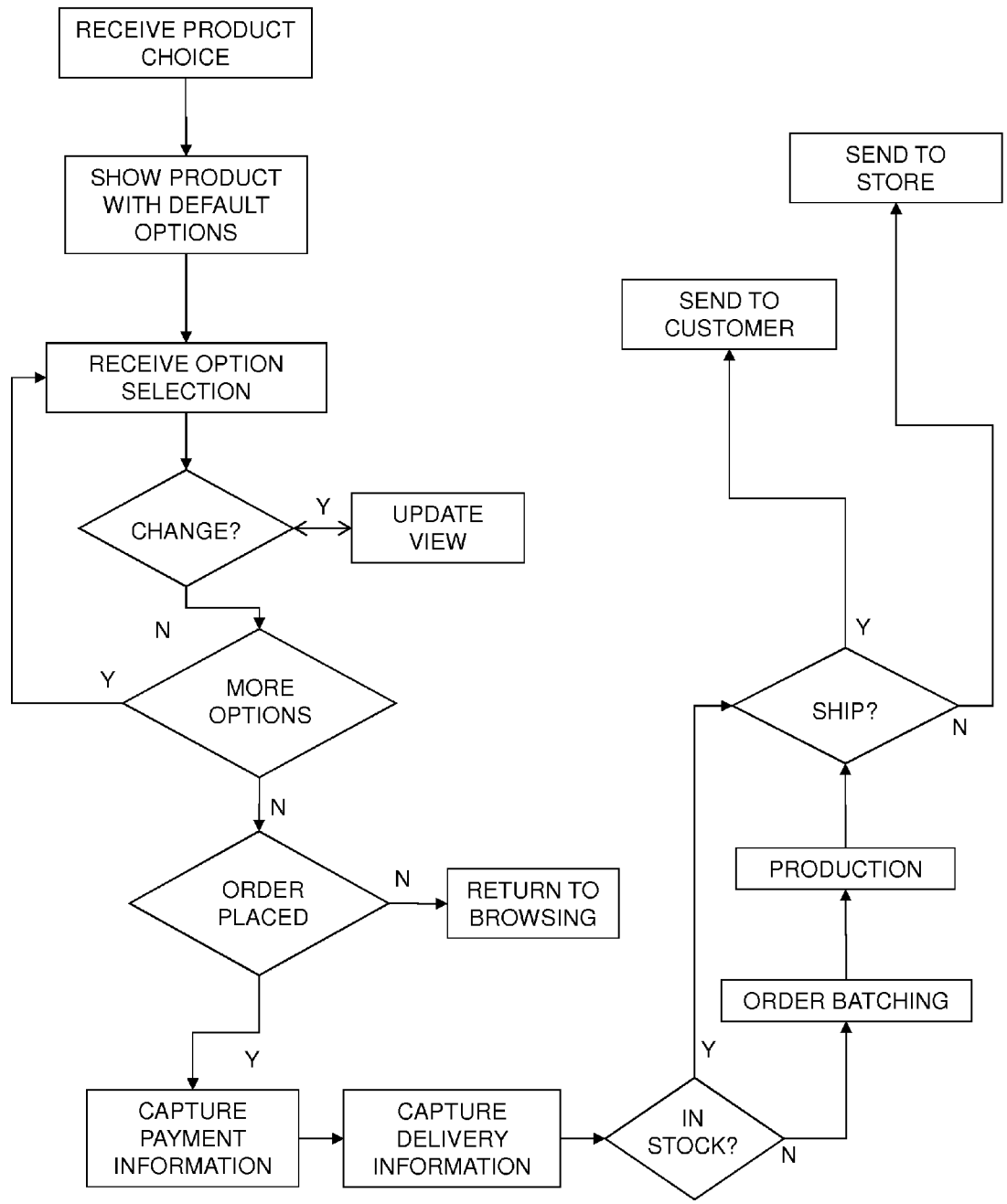
FIG. 9 is a block diagram of a method for providing a customized club head or golf club according to certain embodiments.

Given the variety of options a user may choose and the variety of numbers a user may order, the invention provides methods of receiving and preparing customized orders. FIG. 9 gives a high-level block diagram of steps of a method of providing a customized club head according to certain embodiments of the invention. A method of providing a customized club head according to certain embodiments of the invention can include receiving a user's choice of a product (e.g., product line driver club head) and showing the user a product example (e.g., FIG. 8). A user's selections of an option are received and saved in a memory. If the selection reflects a change from what was previously shown, the displayed product view can be updated to show what the user has chosen. This can be repeated for as many features as are customizable or as many features as the user chooses to select options for.

If the user ends up not placing an order, they can be returned to browsing (e.g., shown a web page home screen or another product screen). Their choices can be saved and displayed to them at a later web page visit.

If the user places an order, methods of the invention include capturing information from the user about how they will pay for the product and how they will receive it. For example, a user can provide a credit card number over a computer network (e.g., by typing into a payment web page), and then choose direct shipping and provide their home address. Or, alternatively, a user can indicate that they wish to use a corporate account (e.g., they are purchasing a dozen club heads that are printed with a corporate logo for which they have uploaded an image file such as a TIFF) and they can specify delivery to some site. A user can also choose in-store pickup. In certain embodiments, a method of providing a customized club head is operable in conjunction with a special event, and methods include capturing delivery information about providing the club heads at the special event.

After delivery information is captured, it is determined whether the ordered item is already in stock, as-ordered. If it is, the ordered item is shipped or prepared for delivery according to the user's delivery information. If the ordered item is not in stock, the order is batched. After order batching, order information (e.g., info regarding batches, production schedules, and individual orders of club heads) is transmitted to a production system or facility, and the ordered club heads are produced. After production, the club heads are sent. If a user has ordered a club to be shipped to their home, the club is sent to the user. If a user has requested in-store pickup, the club is sent to the store. If a user has requested another delivery option, it is so initiated. The produced club heads may be shipped to another facility where they are assembled into clubs, or the club heads may be assembled into clubs on site.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

Any patent or publication mentioned herein is hereby incorporated by reference in entirety for all purposes.

The invention claimed is:

1. A method for producing a golf club component comprising:
    receiving one or more golf club component selections;
    providing material for the golf club component, wherein the material comprises powdered metal; and
    forming the golf club component layer by layer from the material,
    wherein a first portion of the golf club component comprises a first material and a second portion of the golf club component comprises a second material different from the first material.

2. The method of claim 1, wherein the golf club component is a golf club head.

3. The method of claim 2, wherein the golf club head is an iron-type golf club head.

4. The method of claim 1, wherein forming the golf club component layer by layer from the material comprises applying a controlled source of energy to the material layer by layer.

5. The method of claim 1, wherein forming the golf club component layer by layer from the material comprises depositing the material layer by layer.

6. The method of claim 1, wherein the first material has a first density and the second material has a second density.

7. The method of claim 6, wherein the first density and the second density are different by at least 3 g/cm$^3$.

8. The method of claim 1, wherein the golf club component comprises a void.

9. The method of claim 8, wherein the void cannot be created from the same material by casting or stamping the golf club component.

10. A method for producing a golf club component comprising:
    receiving one or more golf club component selections;
    receiving information from a user;
    comparing the information to a database correlating the information and golf club component options;
    outputting golf club component options to the user,
    providing material for the golf club component, wherein the material comprises powdered metal; and
    forming the golf club component layer by layer from the material,
    wherein the golf club component options are selected from the group consisting of golf club head type, golf club shaft type, golf club shaft length, golf club grip type, golf club loft angle, golf club lie angle, golf club head weight, golf club head size, golf club head volume, golf club head shape, golf club shaft shape, golf club head center of gravity, golf club head face size, golf club head color, golf club shaft color, golf club grip color, golf club insignia, golf club head medallion, number of clubs, and a combination thereof,
    wherein the golf club component options are further selected from the group consisting of golf club trajectory sensors, golf club tracking sensors, force sensors, accelerometers, and a combination thereof.

11. The method of claim 10, further comprising, after forming the golf club component, marking the golf club component or a container including the golf club component for delivery to the user.

12. The method of claim 11, further comprising notifying the user that the golf club component has been formed and shipped.

13. The method of claim 10, wherein the information is selected from the group consisting of user name, address, height, weight, sex, handedness, age, geographic location, golf score handicap, club head swing speed, club head angle of attack, club head swing path, physical limitations, annual income, frequency of play, frequency of airline travel, favorite color, alma matter, and a combination thereof.

* * * * *